United States Patent [19]

Gregg

[11] 4,089,305
[45] May 16, 1978

[54] ROTARY INTERNAL COMBUSTION ENGINE

[76] Inventor: Oscar P. Gregg, 2928 Fort Henry Dr., Kingsport, Tenn. 37664

[21] Appl. No.: 669,955

[22] Filed: Mar. 24, 1976

Related U.S. Application Data

[63] Continuation-in-part of Ser. No. 564,736, Apr. 3, 1975, abandoned.

[51] Int. Cl.² ............... F02B 53/00; F01C 19/04
[52] U.S. Cl. ........................... 123/244; 418/139; 418/186; 418/244
[58] Field of Search ............ 123/8.45; 418/144, 139, 418/244, 246, 186

[56] References Cited

U.S. PATENT DOCUMENTS

| | | | |
|---|---|---|---|
| 1,155,092 | 9/1915 | Petersen | 418/139 |
| 3,193,186 | 7/1965 | Peras | 418/144 X |
| 3,244,157 | 4/1966 | Tanferna et al. | 123/8.45 |
| 3,539,280 | 11/1970 | Ravera | 123/8.45 |
| 3,809,024 | 5/1974 | Abbey | 123/8.45 |
| 3,921,596 | 11/1975 | Schulz | 123/8.45 X |

FOREIGN PATENT DOCUMENTS

| | | | |
|---|---|---|---|
| 953,027 | 5/1949 | France | 123/8.45 |
| 422,107 | 1/1935 | United Kingdom | 123/8.45 |

*Primary Examiner*—Carlton R. Croyle
*Assistant Examiner*—Michael Koczo, Jr.
*Attorney, Agent, or Firm*—Mildred K. Flowers

[57] ABSTRACT

Rotary engine construction wherein a lobed rotor cooperates with unique retractable separators to divide the bore into work chambers, the rotor lobes or pistons performing the intake, compression, power and exhaust functions rapidly, efficiently and smoothly, and wherein the simplicity of construction allows the number of firings per rotor revolution, their sequence and the compression ratio to be readily selected for a particular end use. The engine further embodies novel intake and exhaust valves and actuating structure therefor, work chamber inactivation mechanism, and positive oil pumping means.

7 Claims, 28 Drawing Figures

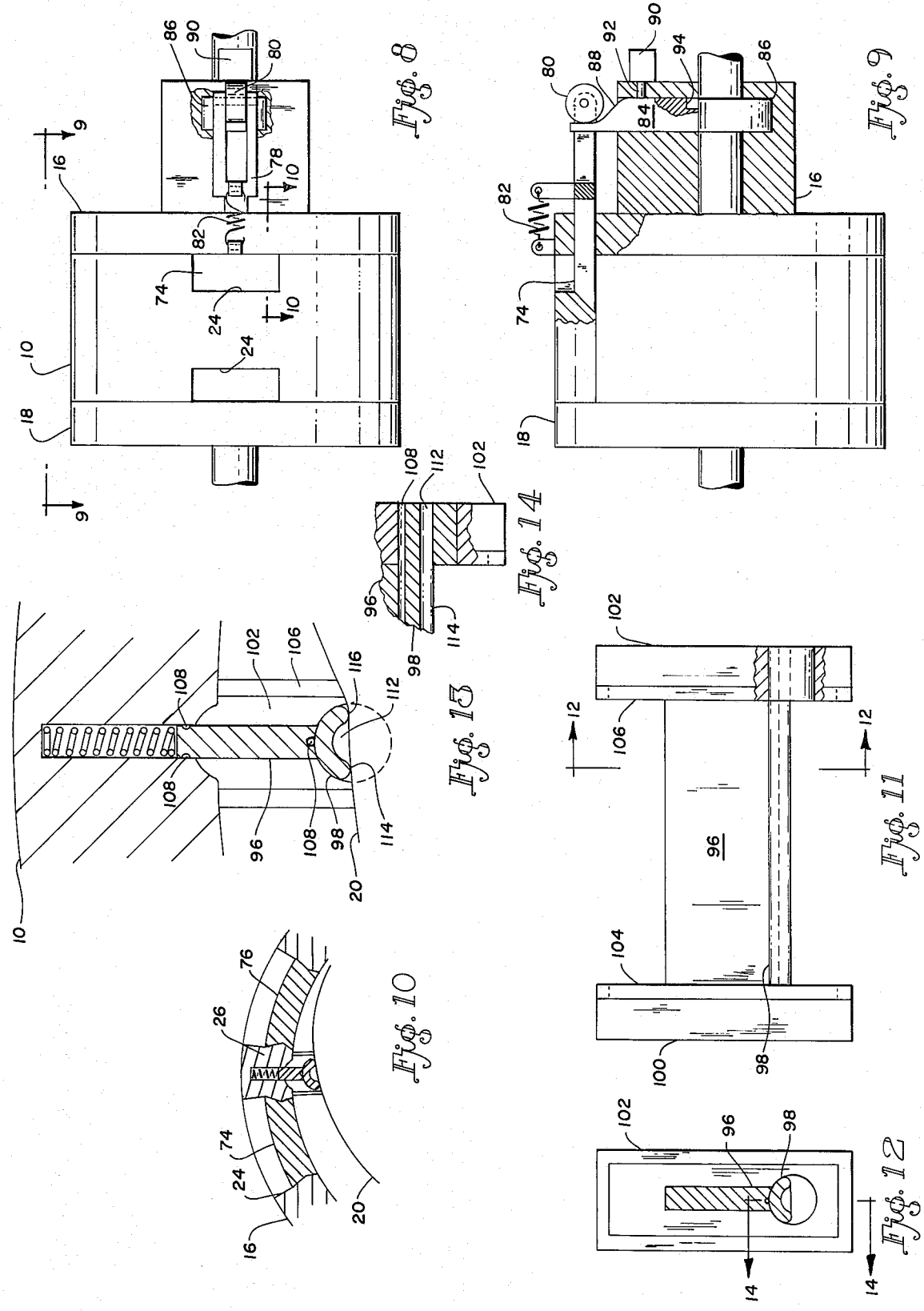

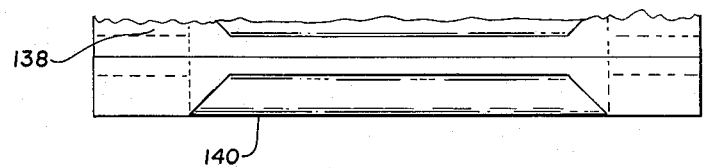
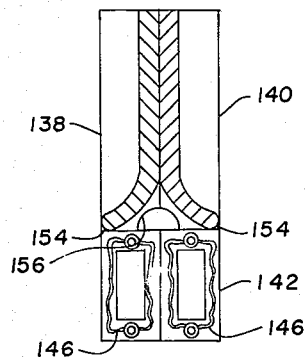
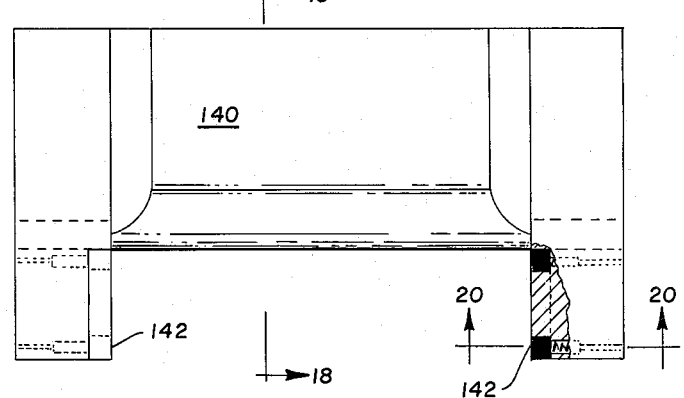
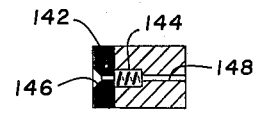
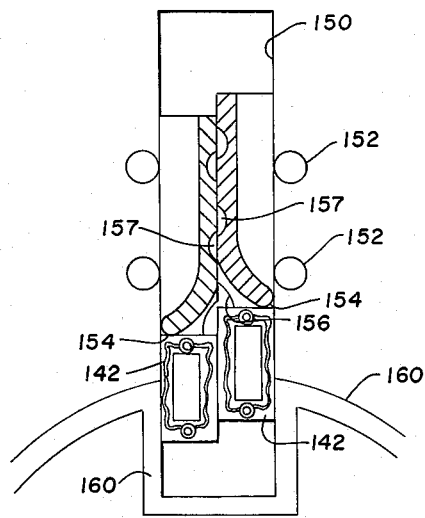
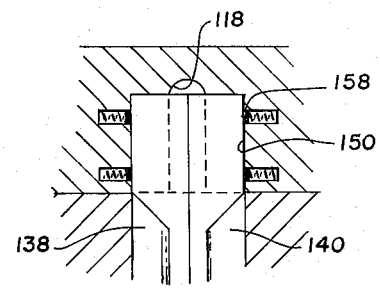

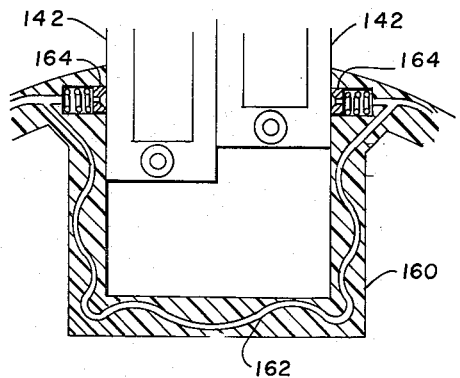
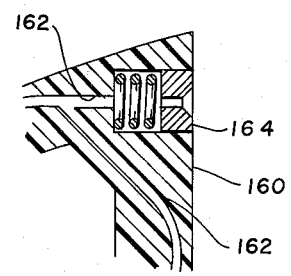
Fig. 23                    Fig. 24
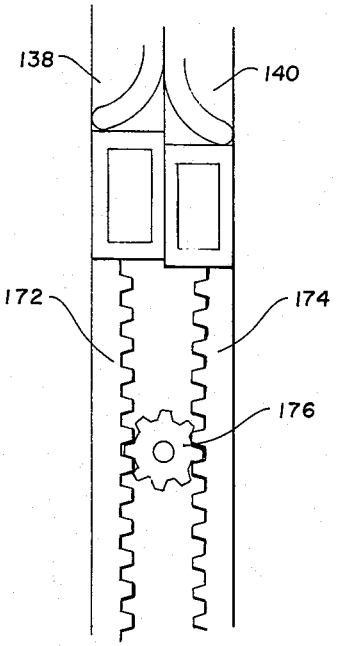
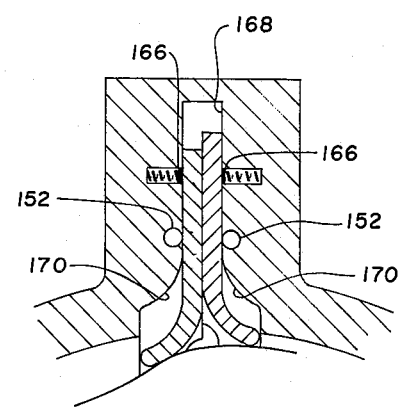
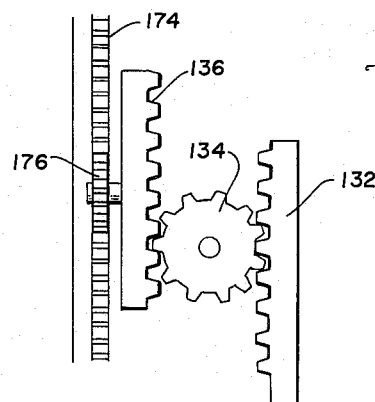
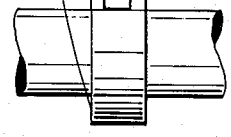
Fig. 25
Fig. 26                    Fig. 27

ROTARY INTERNAL COMBUSTION ENGINE

This application is a continuation-in-part of my co-pending application Ser. No. 564,736, filed Apr. 3, 1975, and now abandoned.

This invention concerns improvements in rotary internal combustion engines of either the gasoline or diesel type and in particular concerns novel configuration of and physical relationship between the rotor, retractable separators which divide the rotor periphery into separate work chambers, and the housing, allowing, if desired, rapid, multiple combustions for each rotor revolution, and also concerns special lubrication means for the retractable separators, special intake and exhaust porting and valves therefor, work chamber inactivation mechanism, and positive oil pumping means.

The invention may, in its broad sense, be defined as improvements in a rotary internal combustion engine having a block and end caps or heads forming a housing, and a rotor mounted in a bore in the block. The improved structure concerns power and service piston means which may comprise a single piston or lobe on the rotor extending toward a portion of the housing, a number of separators retractably mounted in the housing and circumferentially spaced around the bore, said separators being adapted to essentially continuously engage the surface of the rotor including the piston means to define substantially sealed work chambers means, and further being provided with oil conduit means adjacent their inner edges which contact said rotor surface, extending from one end thereof to the other and adapted for connection at one end to an oil supply and at the other end to an oil outlet, the compression face or arc of the power piston means preferably being at least as great as the arc between adjacent separators and substantially concentric with the inner surface of the bore, and intake and exhaust port means communicating with the work chamber means and being operable to feed and exhaust the work chamber means such as in a reciprocating type internal combustion engine.

The invention is illustrated by the accompanying drawings in which:

FIG. 8 is a plan view of a variation of the engine showing large intake and exhaust ports and sliding valves, unique valve actuating mechanism, and unique work chamber inactivation mechanism;

FIG. 9 is a view of FIG. 8 taken in the direction of line 9—9;

FIG. 10 is a cross sectional view of the valve and port structure of FIG. 8 taken along line 10—10;

FIG. 11 is a side view of one type of separator;

FIG. 12 is a cross sectional view of FIG. 11 taken along line 12—12;

FIG. 13 is a view similar to FIG. 12 but showing the separator assembled in the engine;

FIG. 14 is a cross sectional view taken along line 14—14 of FIG. 12;

FIG. 17 is a side view of the dual type separator;

FIG. 18 is a cross sectional view of the paired separators taken along line 18—18 of FIG. 17;

FIG. 19 is a top view of the paired or dual separators of FIG. 17;

FIG. 20 is a cross sectional view taken along line 20—20 of FIG. 17;

FIG. 21 is a variation of the dual separator of FIG. 18;

FIG. 22 is a cross sectional view of the ends of the dual separator as mounted and sealed in the head;

FIG. 23 is an enlarged view of the dual separator showing the oil and compression seal in the head;

FIG. 24 is an enlarged view of the seal of 24 showing the abutting portions provided with supplementary seal;

FIG. 25 shows longitudinal sealing of the dual seal of FIG. 17;

FIG. 26 is an end view, with the head removed, of the positive actuating mechanism for the dual seal;

FIG. 27 is a side view, with the head removed, of the mechanism of FIG. 26; and

Figure 1:
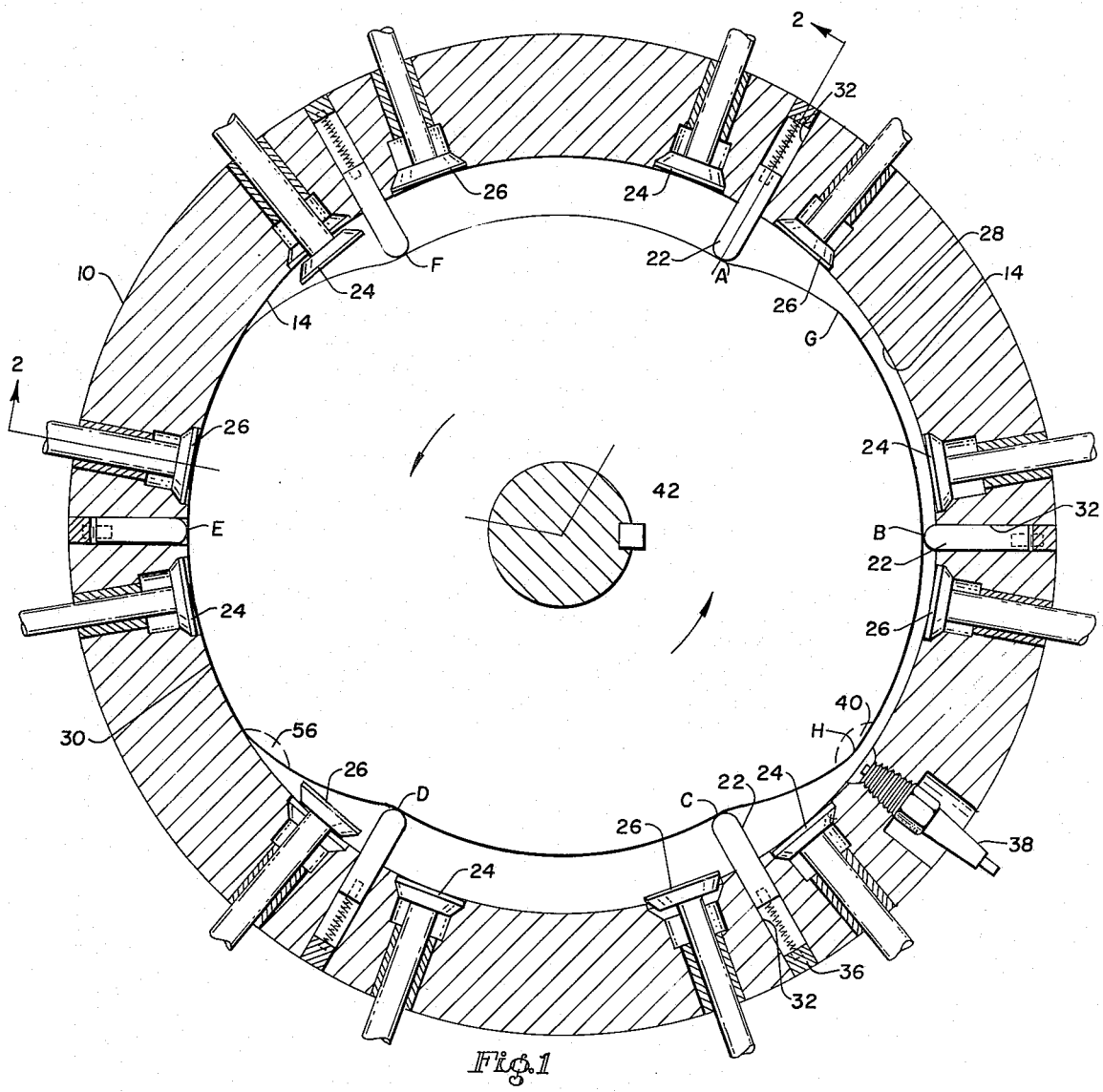
FIG. 1 is an end view of a two piston embodiment of the engine with an end cap or head removed.

Referring to the drawings, the rotary engine comprises a block 10 having a bore defined by wall 14, end caps or heads 16 and 18, a rotor 20, retractably mounted separators 22, intake means 24, and exhaust means 26. The rotor 20 in this embodiment is shaped to provide power piston 28 and service piston 30. The compression face designated G-H of piston 28 is preferably at least as great as the arc between the adjacent separators 22 such as C-B. The length or arc of the pistons may be designed to fit the particular operating characteristics of the engine so as to meet dwell and firing conditions, for example. Where compression face G-H of piston 28 is not as great as the sector seal arc or distance C-B and premature depressurization occurs, maximum fuel compression by and rotating force on piston 28 will not be achieved. The shape of the compression face G-H, that is, whether smooth, irregular, tapered, scalloped or otherwise, is a matter of choice and all such configurations are included within the term "compression face." The arc of service piston 30 is shown to be of a similar length to G-H, but as will hereinafter become evident, the arc of piston 30 may be substantially less than the distance C-B between adjacent separators 22. It is shown that piston 30 extends closer to bore wall 14 than does piston 28. This structure is preferable as hereinafter explained, but is not essential. The peripheral contour of rotor 20 may be varied considerably from that shown in FIG. 1, and it will become evident from the operational description that the contour can be selected by one skilled in the art to give the operational characteristics such as compression ratio suitable for the desired horsepower, fuel type, air consumption, and the like. Contours giving compression ratios of 4:1 to 10:1 are typical, but may be much higher if used as a diesel engine.

Figure 2:
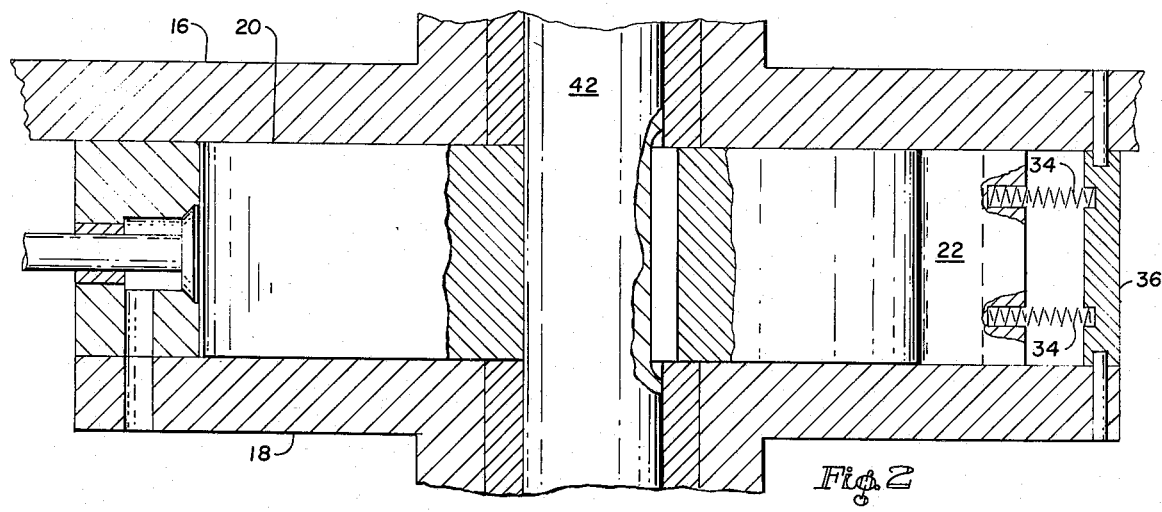
FIG. 2 is a sectional view of the engine taken along 2—2 of FIG. 1.

The intake port means 24 and exhaust port means 26 are shown in FIGS. 1 and 2 as typical automotive valves; however, other valving mechanisms are operable as hereinafter shown. These valves may be actuated in a typical manner by conventional rocker arms, push rods, and cam shaft rotatable with reference to the rotational speed of the rotor 20. The configuration and number of lobes on the cam shaft will, of course, be selected to give the proper actuation depending on the number and desired operating sequence of the valves. Plural cams, gears, or other valve actuating means including closed, continually oiled rocker arm assemblies may, of course, be used. Also, various electrical or hydromechanical devices for operation of valves which could operate in response to rotor rotation or independently thereof could be used.

The separators 22 are depicted as spring urged, retractable sliding vanes which slide in bearing slots 32 in the block. Hydromechanical devices or air pressure could also be used as the means to urge the separators in sealing engagement with the rotor. The slots are shown as cut all the way through the block to segment the same, but such through-slotting is a matter of choce of construction. These separators may be of any of a wide variety of types and configurations known, for example, to the engine art and to the rotary pump art as evidenced by members 25 of U.S. Pat. No. 3,692,002, incorporated herein by reference. As shown in FIG. 2, one or more compression springs 34 seated against separator 22 and against a plug seal 36 continually urge separator 22 against the periphery of rotor 20. Spark plugs 38 are provided at any convenient location, preferably fairly close to the downstream side of each separator 22 as exemplified in FIG. 1 for the work chamber B-C.

Description of the operation of the engine can best be approached by referring to the lettering of the separators A through F and designating the six work chambers formed by the adjacent separators, rotor periphery, and bore wall, as A-B, B-C, C-D, D-E, E-F, and F-A. Power piston 28 has a compression face substantially the distance between G and H and designated G-H, and a power face substantially the radial distance between points C (previously mentioned) and H and designated C-H. The function of this piston is to compress by means of its compression face G-H the air-fuel mixture previously drawn into each work chamber and then receive on its power face C-H the force of the expanding combustion gases to rotate the rotor in a counterclockwise direction in FIG. 1. Service piston 30 is preferably essentially identical to piston 28 in order to balance the rotor, but preferably is shown to extend closer to the bore wall for a purpose becoming evident hereinafter. The function of this piston is to force the expanded combustion gases out of the work chambers and then create a suction force therein to cause fresh air-fuel mixture to enter. The intake and exhaust valves may be recessed in the block if desired to minimize the chance of being struck by the rotor should valve mistiming or some malfunction of the valve retracting mechanism, such as springs, occur.

In the operation of the engine, rotor 20 rotating counterclockwise in FIG. 1 has caused power piston 28 to compress the air-fuel mixture, hereinafter termed fuel, previously sucked into and trapped in work chamber B-C and is in a position for fuel ignition by spark plug 38. As this is occurring, it is seen that piston 28 is compressing fuel in work chamber A-B. In this manner, six firings per revolution are achieved by the embodiment shown in FIG. 1. Where it is desired to operate the engine without providing a spark, a channel 40 in the rearward portion of power piston 28 or any equivalent type passageway, may be provided to carry hot combustion gases into the next chamber to ignite the compressed fuel therein. Other means could also be used such as an electrically controlled valve that would allow the burning gases in one chamber to ignite the fuel mixture in the next chamber at the proper moment.

Exhausting or purging of exhaust gas, and fuel intake is achieved by service piston 30. The fuel intake is shown as having occurred in chamber F-A and as occurring in chamber E-F through the open intake valve 24. The exhaust gas purging operation of piston 30 is shown as occurring in chamber D-E where piston 30 is squeezing the gas out through open exhaust valve 26. The exhaust gas in chamber C-D will next be exhausted by piston 30 as its moves counterclockwise. Since the function of piston 30 is not to compress gas but to suck it in and then exhaust it after combustion, the periphery of this piston may extend very close to the bore wall for increased suction and exhaust gas purging. As an alternative, sliding seals could be used on this piston. The valves 24 and 26 are shown in an operable posture in FIG. 1; however, it is apparent that the opening and closing of the valves may be adjusted and timed such that intake and exhaust durations may be selected for the desired engine operating characteristics. In this regard, piston 30 could be exactly like piston 28 and the intake, compression, firing, and exhaust performed by both in such sequence that both would be performing the same function at the same time to give better balance and less vibration.

The operation of the spark plugs 38 may be controlled conveniently by a typical automotive distributor-coil system actuated from a suitable cam or gear on shaft 42 or on an auxiliary shaft driven thereby. Again, the spark sequence, intensity, and duration may be adjusted in typical fashion to meet the particular needs of the engine.

Figure 4:
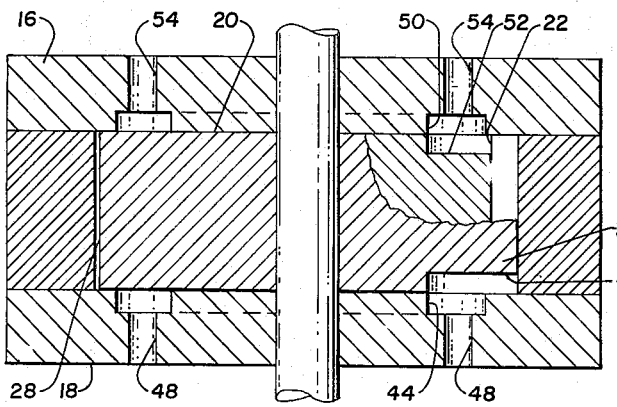
FIG. 4 is a sectional view taken along 4—4 of FIG. 3 showing the manifolding and porting of sliding type valve structure.
Figure 3:
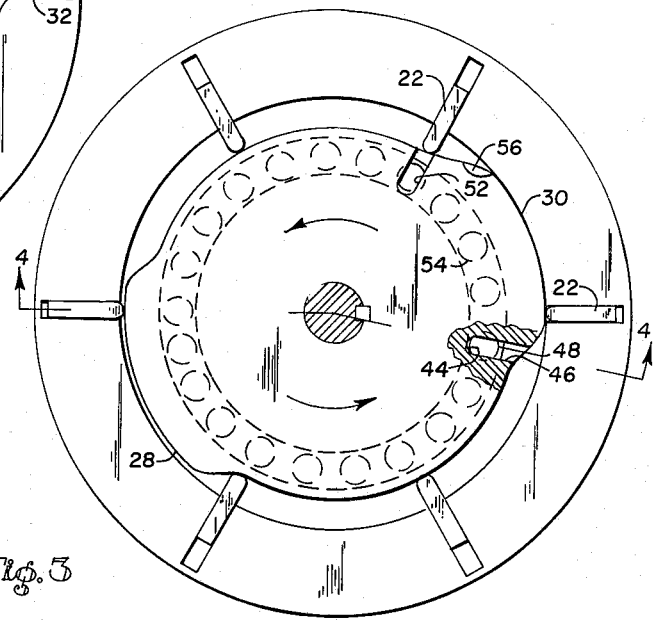
FIG. 3 is an end view of the engine as in FIG. 1 but employing sliding type valving.

Referring to FIGS. 3 and 4, the engine is shown to have a sliding valve type of intake and exhaust structure. This structure comprises an internal intake manifold 44 cut into the inner surface of head 18, or rotor 20, or both if desired, communicating with an inlet port 46 in piston 30 and with fuel inlet means 48 which may comprise a series of apertures 48 in head 18 communicating with carburetion, exterior intake manifold means, fuel injection, or other such means for supplying fuel to the work chambers. The exhaust structure may be the same general configuration and comprises internal exhaust manifold 50, exhaust port 52, and exhaust outlet means 54 in head 16. A purge pocket 56 in the form of a channel, groove, or the like, may be provided in service piston 30 somewhere along its leading face to allow gases trapped in the work chamber, after exhaust port 52 passes separator 22, to be compressed therein and carried into the next work chamber to thereby complete the purging. In this regard it is not preferred to make exhaust port 52 too wide as excessive amounts of expanded combustion gases in the next work chamber to be purged may flow back into the chamber being exhausted. Also, a pocket similar to 56 may be provided along the trailing portion of the service piston to eliminate excessive drag thereon during initial movement of this piston through the work chamber.

Figure 5:
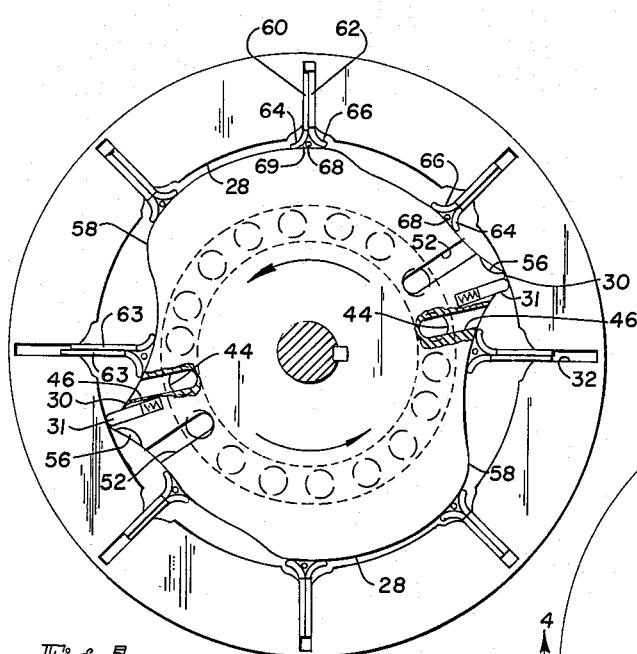
FIG. 5 is an end view of a four piston embodiment of the engine showing a variation in rotor and separator configuration.

Variations of the design of FIG. 1 may, of course, be used such as that shown in FIG. 5 wherein the rotor is shaped to provide two power pistons 28, two service pistons 30, and eight separators 22. Pistons 30 may be provided with spring urged seals 31 as shown or of a construction such as in U.S. Pat. Nos. 3,519,373 or 3,692,002 or the like, incorporated herein by reference, in order to insure complete purging of the work chambers. Pistons 28 compress the fuel and then receive the combustion power, while pistons 30 squeeze the combusted gases out of the work chambers and suck fuel in. The ignition system and valving may conveniently be as in FIG. 3. It is noted that in FIG. 5, the intake chambers formed between the rear of pistons 30 and the leading edges 58 of pistons 28 are made quite deep with respect to the expansion chambers in which combustion occurs and afford considerably more suction and fuel intake. In such a manner the compression ratio may be varied readily. In this figure and in FIG. 6, the separators 22 are shown to comprise two segments 60 and 62 which slide with respect to each other in close fitting, sealing relationship. In this embodiment, the flat portions 63 of the ends of these segments preferably slide in grooves 70 cut into the heads for increased stability. This configuration providing flanges 64 and 66 improves the sealing against the rotor by virtue of pressure in the work chamber bearing downwardly against the flanges. Aperture slot 68 in one of both heads of sufficient length to accommodate the inner and outer travel of the separators and continuously communicating with conduit 69 insures a suitable pressure drop across these flanges during compression in the work chamber. Suitable pressure mechanism, such as the springs of FIGS. 1 and 2, air, or hydraulic means, may also be provided in each cavity 32 to continuously urge these segments against the rotor.

Figure 6:
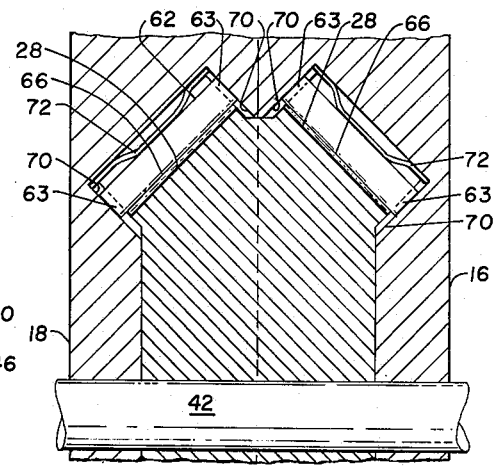
FIG. 6 is a sectional view of the rotor, particularly the periphery and adjacent housing, employing beveled pistons.
Figure 7:
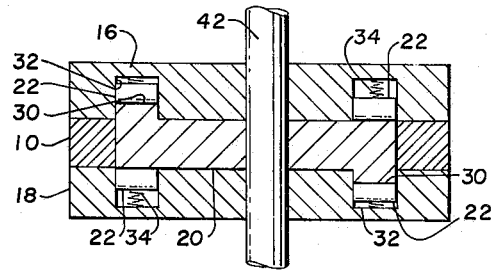
FIG. 7 is a cross sectional view of an embodiment using pistons on the ends of the rotor.

Referring to FIG. 6, it is seen that the pistons may be in any position on the rotor, varying from its periphery as in FIGS. 1–5, to its beveled periphery as in FIG. 6, to its ends as shown in FIG. 7. In each of these figures equivalent structure is identified by the same numeral. In FIGS. 6 and 7, suitable pressure means to urge segments 60 and 62 against the rotor, such as leaf springs 72 in FIG. 6 or any pressure means such as air or hydraulic, may be provided for each segment. In the embodiments of FIGS. 6 and 7, suitable porting and valving such as any of those discussed above may be employed, as well as any desired number of pistons and sector seals.

Figure 28:
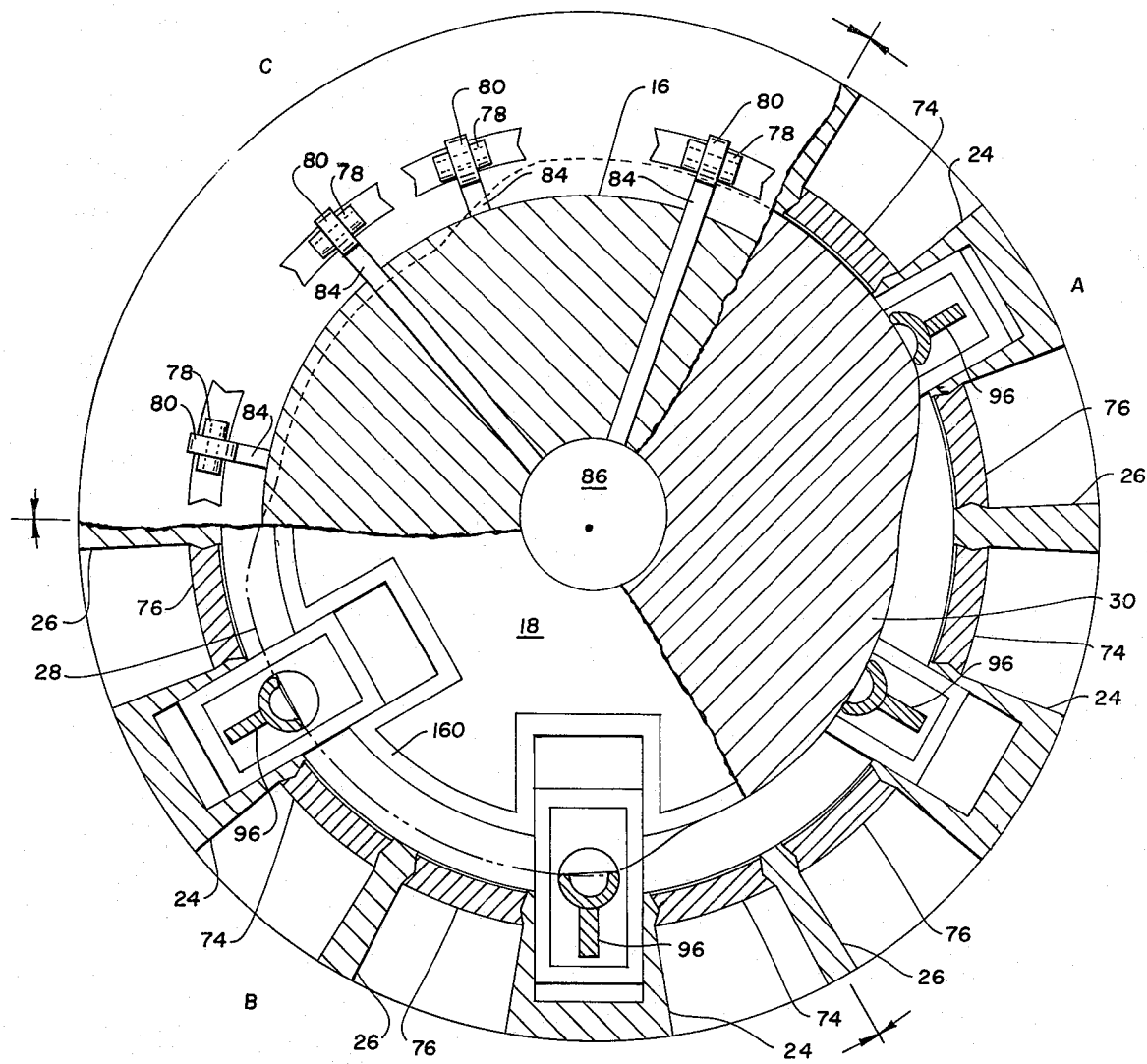
FIG. 28 shows interior and end views looking from right to left of FIG. 9.

Referring to FIGS. 8–10 and 28, the intake and exhaust ports 24 and 26 are shown as positioned on either side of the separator and as close thereto as possible and extending over fairly long arcs to allow for large gas volume flow and rapid intake and exhaust. It is preferable to place these valves as shown in a dual fashion at each end of the engine to give maximum valve porting and gas flow. In FIGS. 8 and 9 only a pair of exhaust valves 74 are shown for illustrative purposes. FIG. 28 shows the complete location of a typical full set valves for one end of the engine. The exhaust valves 74 and intake valves 76 are the sliding type, each carrying a clevis 78, cam follower roller 80, and a closing spring 82. A push rod 84 for each valve is slidably mounted in head 16 and actuable by a proper number of cams 86 mounted on the rotor shaft or an equivalent cam shaft, to retract the valves by means of the cam face 88 to open the ports. Where a single power piston and a single service piston is used, a single cam 86 on each end of the rotor shaft can operate all of the exhaust valves in succession. A single cam on each head could likewise be used for the intake valves (sector C of FIG. 28). This latter cam could be axially inwardly positioned from cam 86 to actuate intake valve push rods 85 (see FIG. 28). A solenoid 90 secured to head 16 carries an armature 92 which may be actuated by proper electrical signal to project into slot 94 in the push rod when it is in the up position to act as a latch and retain valve 74 in full open position to thereby inactivate that particular work chamber when desired. This actuating mechanism and work chamber inactivation system may be provided independently operable for each valve. It is preferred that the electrical system be set up so that armature 92 is retracted only when cam 94 is at its high point in order to prevent slamming of arm 84 against the cam. This inactivation mechanism may be used, for example, at high engine speeds or at idle to aid in reducing fuel consumption. In this regard, the fuel will be automatically cut off to the chambers inactivated, for example, by solenoid valves in the nature of a fuel injection system. The above mechanism is shown on only one head; however, it is apparent that it will be provided on head 18 as well. A particularly useful arrangement for the inactivation system is where nine work chambers are provided and as many as six of them may be inactivated for idling and cruising.

Referring to FIGS. 11–13, a novel separator is shown comprising blade 96, rocket seal 98 which rotates according to the peripheral contour of the rotor and pistons, sliding journals 100 and 102, and seals 104 and 106. Blade 96 may be formed integrally with the journals and provided with oil grooves 108 extending the full length of the blade and through the journals 100 and 102 to communicate with an oil source (oil gallery of the nature of conventional engines) for receiving continuous lubrication.

Figure 15:
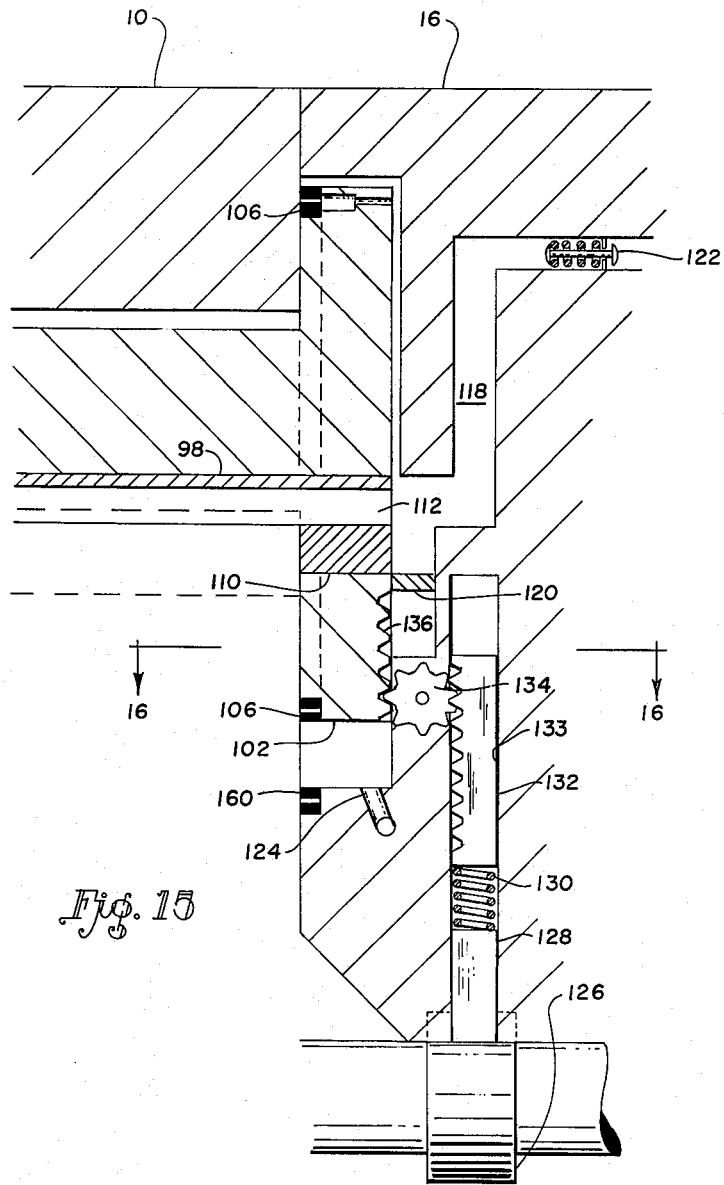
FIG. 15 is a view partly in section showing the end bearing portion of the rocker seal segment.

The rocker seal 98 is shown in further detail in FIG. 15 as comprising end bearings 110 on each end thereof rotatably mounted in the sliding journals 100 and 102, said end bearings each having a through channel 112 to allow oil to flow across the top of the rotor between the edges 114 and 116 of the rocker seal. The oil gallery which lubricates the rocker seal, rotor periphery, sliding journals and associated ports is generally designated 118 and may be contoured as desired throughout the block and heads. A pump 120 is formed on sliding journal 102 as shown in FIG. 15, and moves up and down therewith to pump oil in a positive manner through the gallery in cooperation with outlet valve 122. The other end of the separator positioned in head 18 is of identical construction to that shown in FIG. 15 but an oil inlet valve is oppositely operable to valve 122 to allow oil into the gallery when the separator is down but to close when the separator starts up and begins to force oil out through valve 122. A bleed port 124 communicates with the oil sump and the atmosphere to prevent buildup of pressure underneath the sliding journal.

Figure 16:
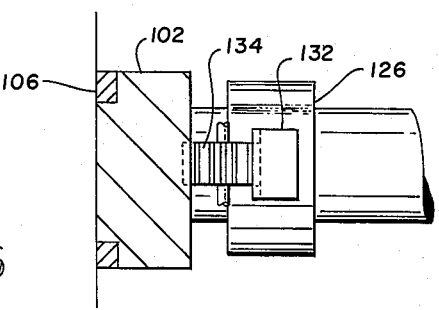
FIG. 16 is a plan view taken along line 16—16 of FIG. 15 with the head removed to show the separator actuating mechanism.

A novel actuating mechanism for each end of the separators is also shown in FIGS. 15 and 16 comprising a cam 126 having oppositely disposed lobes, on the rotor shaft or equivalent cam shaft, a tappet 128, spring 130, gear rack 132 slidable in slot 133 in the head, pinion gear 134, and gear rack 136 formed of the sliding journal. Spring 130 is sufficiently strong to give an initial heavy downward force to the sliding journal immediately after each piston just passes the separator in order to provide a positive and absolute seal of the separator against the rotor periphery. This is very important for high speed operation.

Referring to FIGS. 17–20, the dual type of separator is shown comprising side by side slidable elements 138 and 140. Each of these elements is of one piece construction except for the rectangular oil seals 142 in the end journals and springs 144 which continuously urge the seals into engagement with the ends of the rotor. An oil groove 146 around the face of the seal insures continuous lubrication which is picked up from the oil gallery through ports 148 positioned around the seal as required.

FIG. 21 shows the dual separator with its integral sliding end journal mounted in an appropriate slot 150 in the head and slidable against rollers 152 suitably mounted, preferably on ball bearings, in the head. The elements are shown slightly dislocated as they would be when the rotor periphery is contacting the sealing edges 154 of the elements. Cutouts 156 in each of the sliding journals provide the oil passageway for lubricating the element edges 154 against the rotor. Longitudinal grooves 157 may be provided in the elements to receive lubricating oil from oil gallery 118. In FIG. 22 the sliding journals of the dual separator of FIG. 21 are shown sealed against the slot 150 by spring urged seals 158 extending the full depth of slot 150.

FIGS. 23, 24, and 28 (sector B) show the continuous end seal 160 carried in each head and spring urged continuously against the ends of the rotor to provide a compression seal and lubricating means between the rotor and the heads. Oil groove 162 is provided completely around the face of the seal in the manner of groove 146 of FIG. 20. Shown enlarged in FIG. 24 is a spring urged seal 164 actually located within seal 160 to compressively engage the sides of the seals 142 of the separators to provide a tight seal even though the seals become worn. Seals 164 may be used also with the type separator of FIGS. 11 and 12 to bear against seals 104 and 106. In FIG. 25 a variation of the dual separator is shown with rollers 152 and spring urged longitudinal seals 166 sealing the upper part of slot 168 in the block from the work chamber. It is noted that as with all the separators, the block is recessed at 170 to accommodate the separator sealing edges when the piston on the rotor pushes the separator essentially all the way up into the block.

Referring to FIGS. 26 and 27, the rack and pinion actuator mechanism which is used for the dual separators is essentially the same as that of FIGS. 15 and 16 except that two gear racks 172 and 174, one for each of the aforesaid dual separator elements is used and can move interrelatedly by means of an idle gear 176 which is itself mounted on a gear rack equivalent to rack 136. The remaining pinion gear, rack, spring, tappet, and cam are identical to that of FIGS. 15 and 16 and are numbered the same.

In the most elemental form of the present invention wherein a power piston such as 28 is also employed as the service piston in an engine such as shown in FIG. 1, compression and combustion may be caused to occur during one rotation while exhaust and intake occur during the next rotation. The valve operation and ignition would, of course, be regulated to produce this cycle. In such an engine employing just one piston, a minimum of two sector separators 22 would be required. To produce one or more firings on each revolution, multiple separators and valves are, of course, required, and their operation may be controlled to alternate the firing of successive work chambers.

In practicing the invention, any number of separators 22 and any number of pistons may be used, and the drawings herein are intended to show exemplary operable embodiment and the best modes known to applicant for carrying out this invention. As long as the compression face G-H of the power piston is substantially as long as the distance between adjacent sector seals and work chamber means are provided thereby, a proper firing order could be used in creating a workable rotary engine in all of the following ways:

One piston and any number of separators and work chambers. During one revolution of the piston all work chambers would be serviced, and during the second revolution the piston would compress fuel mixture and receive an explosive force as it passed through each work chamber. In other words, the first time around the piston acts as service piston and the second time around acts as power piston.

One piston and any even number of separators and work chambers. During the first revolution the piston would service odd numbered work chambers and act as power piston in even numbered work chambers. On the second revolution the above action taking place in each work chamber would be reversed.

Two pistons, any even number of separators and work chambers. One piston would act as a service piston in even numbered chambers and as a power piston in odd numbered work chambers. Other piston would do the opposite to first piston as it passes through the same work chambers.

Two pistons, one power and one service, any logical number of separators. Service piston would service all work chambers (push out exhaust and create vacuum for intake) and power piston would compress fuel mixture and receive explosive force as it passes through each work chamber.

Two, four, six, eight, or more even numbered pistons, half being service pistons and half being power pistons. The number of separators is selected to give the logical number of work chambers. The number of pistons needed would depend on diameter of rotary engine, the bigger the diameter, the more pistons that could be used conveniently.

The fuel and air may be fed by carburetion and intake manifold, or by fuel injection means in conventional manner. A particularly useful and novel approach to injecting fuel into the engine is to use the expanded gases of previous combustions to actuate a piston or pump to force the fuel into the work chamber. Another approach would be to confine fuel and air behind the fuel injection piston and then ignite it at the appropriate time by any means such as hot gases from previous combustion. The engine is capable of running as a diesel and the ignition system may be used during warm-up. Any type of fuel which will readily ignite may be used including those fuels which employ water. Also, it is apparent that supercharging devices may be incorporated into the system.

In any of the embodiments shown, sealing means such as sliding seals may be located on either the ends of the rotor or in the heads to insure proper isolation of the work chambers from each other. These seals may be in the form of continuous seals following the outline of the rotor and piston lobes.

The invention has been described in detail with particular reference to preferred embodiments thereof, but it will be understood that variations and modifications can be effected within the spirit and scope of the invention.

I claim:

1. In a rotary internal combustion engine having a housing comprising a block having a bore with a rotor mounted therein and heads on the ends of said block, the improvement comprising piston means on said rotor extending toward said housing, a plurality of retractable separators circumferentially spaced in said housing and adapted to sealingly engage said rotor means including said piston means to define work chamber means, said piston means having arcute compression face means at least substantially as long as the arc between adjacent separators forming said work chamber means, wherein the separators comprise two segments in side by side sliding arrangement, each segment having a flange on its inner end flared away from the other flange to provide a conduit therebetween in conjunction with the rotor surface, and aperture means in said housing communicating with the atmosphere and with said conduit to provide a pressure drop across each of said flanges.

2. In a rotary internal combustion engine having a housing comprising a block having a bore with a rotor mounted therein and heads on the ends of said block, the improvement comprising piston means on said rotor extending toward said housing, a plurality of retractable separators circumferentially spaced in said housing and adapted to sealingly engage said rotor means including said piston means to define work chamber means, said piston means having arcuate compression face means at least substantially as long as the arc between adjacent separators forming said work chamber means, said separators having dual sealing edges for bearing against the rotor, and intake and exhaust port means communicating with said work chamber means, and comprising at least one power piston and at least one service piston circumferentially spaced on said rotor and extending toward the wall of said bore, wherein the arc of the compression face means and the arc of the bore are essentially concentric, and wherein there are two oppositely disposed power pistons and two oppositely disposed service pistons on the rotor, and wherein the separators comprise two segments in side by side sliding arrangement, each segment having a flange on its inner end flared away from the other flange to provide a conduit therebetween in conjunction with the rotor surface, and aperture means in said housing communicating with the atmosphere and with said conduit to provide a pressure drop across each of said flanges.

3. The engine of claim 2 wherein the service pistons are provided with seals which slide along and in contact with the engine bore surface.

4. The engine of claim 2 wherein each segment of the separator is provided on its ends with sliding journals adapted to slide in channels in the adjacent head.

5. In a rotary internal combustion engine having a housing comprising a block having a bore with a rotor mounted therein and heads on the ends of said block, the improvement comprising piston means on said rotor extending toward said housing, a plurality of retractable separators each having separate sealing edges, circumferentially spaced in said housing and adapted to sealingly engage said rotor means including said piston means to define work chamber means, said piston means having arcuate compression face means at least substantially as long as the arc between adjacent separators forming said work chamber means, and wherein an oil gallery is provided in each head and is interconnected by conduit means formed between the separator sealing edges and the rotor periphery.

6. In a rotary internal combustion engine having a housing comprising a block having a bore with a rotor mounted therein and heads on the ends of said block, the improvement comprising piston means on said rotor extending toward said housing, a plurality of retractable separators circumferentially spaced in said housing and adapted to sealingly engage said rotor means including said piston means to define work chamber means, said piston means having arcuate compression face means at least substantially as long as the arc between adjacent separators forming said work chamber means, and wherein separator actuating means is provided comprising a gear rack slidably mounted in each head, a tappet slidably mounted in substantial axial alignment with each of said gear racks, a spring interposed between said tappet and the respective gear rack, a cam operably connected to said rotor and engagable with each of siad tappets, wherein the opposite ends of each separator are provided with gear racks, and wherein an idler gear is rotatably mounted in each head and mates with said gear racks to transmit radially inwardly directed force to the separator to maintain the same in sealing contact with the rotor periphery.

7. In a rotary internal combustion engine having a housing comprising a block having a bore with a rotor mounted therein and heads on the ends of said block, the improvement comprising piston means on said rotor extending toward said housing, a plurality of retractable separators circumferentially spaced in said housing and adapted to sealingly engage said rotor means including said piston means to define work chamber means, said piston means having arcuate compression face means at least substantially as long as the arc between adjacent separators forming said work chamber means, said separators having dual sealing edges for bearing against the rotor, and intake and exhaust port means communicating with said work chamber means, wherein a continuous oil and compression seal is positioned in each head and is spring urged against the adjacent end of the rotor, and wherein the separators are provided with a sliding journal on each end, which journals are slidably mounted in channels in their adjacent head, and wherein each sliding journal is provided wih an oil and compression seal and spring means is interposed between the sliding journal and respective oil and compression seal whereby said oil and compression seal is spring urged against the ends of the rotor adjacent said continuous seal in the head, and wherein the separator comprises two side by side elements, each having its own sliding journals and each having a sealing edge for sliding contact with said rotor.

* * * * *